US006590000B2

(12) United States Patent
Varadaraj

(10) Patent No.: US 6,590,000 B2
(45) Date of Patent: Jul. 8, 2003

(54) DEFOAMING OF FOAMS UTILIZING SONICATION

(75) Inventor: Ramesh Varadaraj, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/803,574

(22) Filed: Mar. 9, 2001

(65) Prior Publication Data

US 2002/0128328 A1 Sep. 12, 2002

(51) Int. Cl.$^7$ .......................... B01D 19/00; B01D 19/04
(52) U.S. Cl. ...................... 516/123; 516/115; 516/134; 95/30; 95/242; 96/175
(58) Field of Search ................................ 516/115, 123, 516/134; 210/748; 95/30, 242; 96/175

(56) References Cited

U.S. PATENT DOCUMENTS

| 2,864,502 | A | * | 12/1958 | May | 516/115 |
|---|---|---|---|---|---|
| 3,238,144 | A | * | 3/1966 | Fortman | 516/197 |
| 3,686,115 | A | * | 8/1972 | Farman et al. | 210/748 |
| 4,127,394 | A | * | 11/1978 | Verhille | 95/30 |
| 4,832,807 | A | * | 5/1989 | De Jong et al. | 204/157.62 |
| 5,110,443 | A | * | 5/1992 | Gregoli et al. | 137/13 |
| 5,460,756 | A | * | 10/1995 | Redding, Jr. | 264/4 |
| 6,106,590 | A | * | 8/2000 | Ueno et al. | 95/30 |

FOREIGN PATENT DOCUMENTS

EP                0 824 948 A2 *  2/1998

OTHER PUBLICATIONS

Milton J. Rosen, Surfactants and Interfacial Phenomena, Second Edition, (John Wiley & sons, NY, NY, copyright 1989—month unknown), pp. 276–281.*
Sandor et al, "Foam destruction by ultrasonic vibrations", Journal of colloid and Interface Science, vol. 161, (1993—month unknown), pp. 265–267.*
Cole–Palmer 1987–1988 Catologue (Cole–Palmer Instrument Company, Chicogo, ill, copyright 1986 month unknown) pp. 398–399.*
"Somochemical Treatment of Fossil Fuels"; Kazem M. Sadeghi, Jiunn–Ren Lin; Teh Fu Yen; Energy Sources, Vol. 16, pp. 439–449, U.K., Department of Civil and Environmental Engineering, University of Southern California, Los Angeles, California, (copyright 1994) Month Unknown.

An Upgrading Process Through Cavitation and Surfactant; Jiunn–Ren Lin and Teh Fu Yen; Engery & Fuels 1993, vol. 7, pp. 111–118; Department of Civil and Environmental Engineering, University of Southern California, Los Angeles, California; Received Jun. 1, 1992. Revised Manuscript Received Oct. 6, 1992.
"Ultrasound in Synthesis"; Kenneth S. Suslick; Modern Synthetic Methods 1986, vol. 4; School of Chemical Sciences University of Illinois at Urbana–Champaign, 505 S. Mathews Av., Urbana, Illinois 61801, 1986 Month Unknown.
"Processing of Residual Oil Products by Visbraking in Presence of Additive in Form of Aromatised Fraction or Acetone, with Initial Cavitation Treatment of Starting Material"; M. B. Basin, Gimbutas, A. S and V. Yu Vaninora; Mazheiksk Nafta Refinery, (Abstract only), RU 2021994, (Oct. 1994).
"Use of the Ultrasonic Cavitation Effect of Reduce Oil Viscosity and Increase its Rate of Transport"; V. G. Andreev; O. S. Bryukhovetskii; O. I. Ponomareva and V. N. Rodionov; Pet. Abstr. 658, 109; Izv. Vyssh. Ucheb. Zavedenii, Geol. Razvedka (4), (Jul.–Aug. 1996); Use of theP Petroleum Abstracts Abstr. No. 658, 109 V37, N.40, (Oct. 4, 1997), (Abstract Only).
"Cavitation Method for Processing Petroleum Refining Residues"; Akcine Bendrove 'Mazeiku Nafta; Basin, Michail Borisovic; (Copyright 1997 by the American Chemical Society, CA 127:6987Q), (Abstract Only).
"The Effects of Ultrasonic Treatment on the Viscosity of Athabasca Bitumen and Bitumen–Solvent Mixtures", A Chakma and F. Berruti; The Journal of Canadian Petroleum Technology, May 1993 (vol. 32, No. 5); pp. 48–51.
"Ultrasonic Visbreaking of Athabasca Bitumen"; Amit Chakma and Franco Berruti; Petroleum Society of CIM and AOSTRA, Paper No. CIM/AOSTRA 91–9; Presented at the CIM/AOSTRA 1991 Technical Conference in Banff, Apr. 21–24, 1991; Month Unknown pp. 9–1 to 9–5.
"Ultasonic Visbreaking of Athabasca Bitumen"; A. Chakma and F. Berruti; Energy Processing/Canada; Sep.–Oct., 1991; pp. 16–19.

* cited by examiner

*Primary Examiner*—Daniel S. Metzmaier
(74) *Attorney, Agent, or Firm*—Estelle C. Bakun; Ramesh Varadaraj

(57) ABSTRACT

The invention includes a method for defoaming aqueous or non-aqueous foams comprising placing a sonicator probe directly into said foam and thereafter sonicating said foam in pulse mode at a sonication energy of at least about 25 watts/cm$^2$ for a time required to collapse the foam.

12 Claims, No Drawings

DEFOAMING OF FOAMS UTILIZING SONICATION

FIELD OF THE INVENTION

The invention includes a method for defoaming aqueous and nonaqueous foams and mixtures thereof utilizing sonication to collapse the foams.

BACKGROUND OF THE INVENTION

In several upstream, downstream and chemicals operations foam control and mitigation are critical to process efficiency. In processing units where aqueous or hydrocarbon liquids are mixed vigorously in aerated environments, foams are generated. Presence of surface active polar species in the liquid phase of the foam result in copious and stable foam. Such foams result in process upsets and limit the capacity utility of process units. The current approach for foam control, in the majority of the cases, is chemical defoamer treatment. Chemical defoamers, in addition to being speciality chemicals, are not robust and in most cases are application sensitive.

Aqueous and hydrocarbon liquids that have polar surface-active species when subject to vigorous mixing in aerated or gaseous environments tend to foam. Examples of such surface active species are low molecular weight surface active naphthenic acids, basic and acidic asphaltenes, basic nitrogen containing organic compounds and calcium/sodium salts of $C_6$ to $C_{20}$ hydrocarbon chain acids and sulfates. These polar interfacially active compounds stabilize liquid-gas interfaces and form viscoelastic films at the liquid-gas interface. Further, sub micron size solids like silica and clay when present in the liquid phase, interact with the polar compounds and form solids-stabilized organic films at the liquid-gas interface. The stability of foams has been attributed to the viscoelastic nature of these films. The two principal defoaming approaches known in the art are replacement of the surface active polar compounds with chemical defoamer molecules that form rigid films that are not viscoelastic and solubilization of the polar surface active species stabilizing the liquid-gas interface with solvents like alcohols, ethers and aromatic solvents.

A non-chemical approach to defoaming is needed and yet to be realized in the industry.

SUMMARY OF THE INVENTION

The invention includes a method for defoaming a foam comprising sonicating said foam at a sonication energy of at least about 25 watts/cm², wherein said foam is selected from the group consisting of aqueous and nonaqueous foams and mixtures thereof and wherein said foam comprises a dispersion of a gas or vapor in a liquid.

The invention may further optionally comprise adding defoamer chemical additives or solvent to said foam prior to or during said sonication.

DETAILED DESCRIPTION OF THE INVENTION

The invention includes a method for defoaming or collapsing a foam which can be an aqueous, non-aqueous, or a mixture of an aqueous and non-aqueous foam.

An aspect of the invention is directed to a method for defoaming or collapsing aqueous or nonaqueous foams by sonicating the foam at an energy sufficient to break the viscoelastic film at the liquid-gas interface. The foams may be subjected to sonication in a frequency range of 15 kHz to 10 MHz preferably 20 kHz to about 10 MHz, and most preferably about 20 kHz frequency and energies at least about 25, preferably about 25 to about 500 watts/cm² which causes rapid foam collapse. The mechanism of foam collapse can be attributed to high-energy compression and rarefaction waves propagating through the foam body causing cavitation and shock induced film breakage and subsequent coalescence of the dispersed gas. Sonication can be accomplished by introducing a sonication probe directly into the foam to be acted upon.

The major advantage of this method over prior art methods is that it includes a non-chemical approach for foam collapse. Optionally, sonication can be combined with chemical defoamer additive or solvent addition prior to or during sonication to enhance the effectiveness of foam collapse. If such components are desired, they can be introduced into the foam by techniques known to the skilled artisan such as spraying the defoamant additive or solvent into the foam.

The sonication defoaming method disclosed herein may be applied to applications in crude oil production, refining and chemicals operations where foam control and mitigation are critical to process efficiency. Examples include use in oil-water-gas separators (production operations), delayed coker drum foams (refining) and polymer processing and chemicals manufacturing or synthesis including aromatics alkylation reactors and aromatics or crude oil resid sulfonation reactors.

The method described herein is applicable to aqueous and nonaqueous foams and mixtures thereof.

The aqueous phase of the foam comprises water and may additionally include water containing salts of halides, sulfates and carbonates of Group 1 and Group 2 elements. The hydrocarbon phase, in the case of non-aqueous foam, can comprise crude oil, crude oil distillates, vegetable oils, synthetic oils and animal fatty oils. The foams are typically comprised of a liquid and gaseous phase. The polar species present in the liquid phase of the foams encountered in production, refining and chemicals processes are generally surface active species such as, low molecular weight surface active naphthenic acids, basic and acidic asphaltenes, basic nitrogen containing organic compounds, calcium/sodium salts of $C_6$ to $C_{20}$ hydrocarbon chain acids and sulfates, submicron size solids like clays, silica, carbon black, refinery coke fines, polymer particulate and other inorganic and organic solids. The gaseous component of the foam can be air, nitrogen, inert gases or hydrocarbon gases like ethane, propane, butane, isobutane and mixtures thereof. The gaseous component of the foam can also be vapors of hydrocarbons or mixtures of vapors of hydrocarbons and air, nitrogen or inert gases.

While sonication alone is effective in foam collapse, sonication can be combined with chemical defoamer additive or solvent treatment.

If chemical defoamer additives or solvents are utilized, the chemical defoamer additive or solvent treatment will preferably be conducted prior to sonication. Chemical defoamer additive or solvent treatment reduces sonication time and the sonication energy or intensity required to collapse the foam. Mixtures of chemical defoamer additive and solvents may also be employed. Solvents may be utilized alone, however, defoamant additives require a carrier solvent and therefore must be used in conjunction with a solvent.

Chemical defoamer additives and solvents are readily identifiable to the skilled artisan. Solvents may comprise alcohols, ethers, hydrocarbons and mixtures thereof such as methanol, ethanol, normal propanol, iso-propanol, normal butyl alcohol, iso butyl alcohol, teritary butyl alcohol, diethyl ether, aromatic hydrocarbon solvents including toluene, xylene and mixtures thereof (including ortho-, meta-, para and other isomers).

Chemical defoamer additives are well known in the art and are also easily selected by the skilled artisan. For example, they comprise siloxane oligomers, fluorocarbon ethoxylate surfactants, and mixtures thereof.

Sonication is the act of subjecting a system to sound (acoustic) waves. The velocity of sound in liquids is typically about 1500 meters/sec. Ultrasound spans the frequency of about 15 kHz to 10 MHz with associated wavelengths of about 10 to 0.02 cm. The invention may be practiced at frequencies of about 20 kHz to about 1 MHz. The output energy at a given frequency is expressed as sonication energy in units of watts/cm$^2$. The sonication provided for in the instant invention is typically accomplished at energies of at least about 25 and preferably about 25 to about 500 watts/cm$^2$. The sonication may be applied in any fashion including continuous and pulse modes.

The process may be conducted at temperatures of the foam of about 20 to about 200° C. and at pressures from ambient to 1000 psig (1480.4 kPa).

The chemical defoamer additive or solvent will preferably be added to the foam prior to or during sonication. The amount of defoamer additive or solvent to be added will range from about 0.1 to about 5.0 wt % based on the amount of the liquid phase of the foam. One skilled in the art can readily determine the amount of liquid present in the foam by taking a sample of the foam and collapsing it to determine the amount of liquid present therein.

One skilled in the art will recognize that use of a defoamer additive will serve to lower the sonication energy necessary to break the interfacial film of the foam. Hence, it may be desirable to utilize a defoamer additive. Furthermore, a limited number of foams may require the use of a defoamer additive due to the strength of the interfacial film. Such foams will be readily identifiable to the skilled artisan since sonication alone will not break the foam sufficiently.

The invention is applicable to any foam, especially those containing components such as organic acids and solids, and which may additionally include asphaltenes, basic nitrogen compounds. Thus, the hydrocarbons forming a non-aqueous foam, or mixture of an aqueous and nonaqueous foam may include crude oils, crude oil distillates, crude oil resids, or oils derived from plant or animal sources such as vegetable oils and animal oils or synthetic oils such as silicone oils. The foams may likewise include surfactants or other components present in the hydrocarbon or added thereto.

In applying the sonication to the foam, one skilled in that art will recognize that the sonication energy or intensity must be tuned to effect collapse of the foam. Hence the sonication energy may be increased from at least about 25 watts/cm$^2$ in at least about 25 watts/cm$^2$ increments until collapse is observed, up to about 500 watts/cm$^2$. Typically, about 5 to about 10 minutes should elapse between each incremental increase of the sonication energy.

The following examples are meant to be illustrative and not limiting in any way.

EXAMPLE-1

Defoaming of Aqueous Foams by Sonication

The general procedure to prepare aqueous foam involved adding 0.5 g of a non-ionic surfactant, dodecyl hexaethoxy alcohol (sold under the trade name Emerest 2661 by Henkel Corporation, Pa.) to 100 ml water followed by mixing. A Silverson mixer supplied by Silverson Machines, Inc. East Longmeadow, Mass. was used for mixing. Mixing was conducted at 25° C. and at 1000 to 2000 rpm for a time required to create a foam of height 5 cms in a cylinderical vessel.

To the so generated foam was introduced a sonicator horn and the foam sonicated. A Vibra Cell Sonicator (Sonics and Materials Inc. Danbury, Conn.) was used and 20 kHz frequency acoustic waves were introduced into the foam body for 1 minute. A complete collapse of the foam was observed. The sonication intensity was varied in increments of 50 Watts/cm$^2$. Foam collapse was observed at 300 Watts/cm$^2$. Both the continuous and pulse modes of operation were effective in collapsing the foam.

In the control experiment, foam was generated as described above and the foam allowed to stand. Less than 10% of the foam was observed to collapse during a 60-minute observation period.

EXAMPLE-2

Defoaming of Non-aqueous Foams by Sonication

The general procedure to prepare a non-aqueous foam involved adding 0.5 g of a commercial 350 molecular weight petroleum naphthenic acid sold by Pfaltz and Bauer Inc., to 100 ml a hydrocarbon distillate mixture comprising 40/30/30::Isopar-M/Solvent 600 N/Aromatic 150 followed by vigorous mixing. A Silverson mixer supplied by Silverson Machines, Inc. East Longmeadow, Mass. was used for mixing. Mixing was conducted at 25° C. and at 2000 to 4000 rpm for a time required to create a foam of height 5 cms in a cylinderical vessel.

To the so generated foam was introduced a sonicator horn and the foam sonicated. A Vibra Cell Sonicator was used and 20 kHz frequency acoustic waves were introduced into the foam body for 1 minute. A complete collapse of the foam was observed. The sonication intensity was varied in increments of 50 Watts/cm$^2$. Foam collapse was observed at 200 Watts/cm$^2$. Both the continuous and pulse modes of operation were effective in collapsing the foam.

In the control experiment, foam was generated as described above and the foam allowed to stand. Less than 10% of the foam was observed to collapse during a 20-minute observation period.

What is claimed is:

1. A method to collapse a foam comprising placing a sonicator probe directly into said foam and thereafter sonicating said foam in pulse mode at a sonication energy of at least about 25 watts/cm$^2$ for a time required to collapse the foam and wherein said foam is selected from the group consisting of aqueous and non-aqueous foams and mixtures thereof and wherein said foam comprises a dispersion of a gas or vapor in a film of liquid.

2. The sonication of claim 1 wherein said sonication is conducted at an acoustic frequency in the range of 20 kHz to 1 MHz.

3. The sonication of claim 1 wherein the sonication energy in the range of 25 to 500 watts/cm$^2$.

4. The method of claim 1 further comprising adding a solvent to said foam prior to or during sonication.

5. The method of claim 4 wherein a mixture of solvent and chemical defoamer additive is added to said foam prior to or during sonication.

6. The method of claim 5 wherein said defoamant additive is selected from the group consisting of siloxane oligomers, fluorocarbon ethoxylate surfactants, and mixtures thereof.

7. The method of claim 4 wherein said solvent is selected from the group consisting of alcohols, ethers, and hydrocarbon solvents and mixtures thereof.

8. The method of claim 1 wherein said method is applied in crude oil production operations, crude oil refining operations, or chemicals manufacturing or synthesis operations.

9. The method of claim 6 wherein said foam is in oil-water-gas separators, crude oil refinery delayed coker drums, polymer processing reactors, aromatics alkylation reactors and aromatics or resid sulfonation reactors.

10. The method of claim 1 wherein said gaseous component of said foam is comprised of air, nitrogen, inert gases, hydrocarbon gases, and mixtures thereof.

11. The method of claim 1 wherein said sonicating step is conducted at a sonication energy in the range of 25 to 500 waifs/cm$^2$ in increments of about 25 watts/cm$^2$.

12. The method of claim 1 wherein said sonicating step is conducted for a time of about 1 minute.

* * * * *